(12) United States Patent
Sohn

(10) Patent No.: US 9,385,354 B2
(45) Date of Patent: Jul. 5, 2016

(54) BATTERY PACK FOR A VEHICLE

(75) Inventor: Kwon Sohn, Suwon-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 560 days.

(21) Appl. No.: 12/805,438

(22) Filed: Jul. 30, 2010

(65) Prior Publication Data

US 2011/0183177 A1    Jul. 28, 2011

(30) Foreign Application Priority Data

Jan. 26, 2010 (KR) ................. 10-2010-0007040

(51) Int. Cl.

| | |
|---|---|
| *H01M 2/10* | (2006.01) |
| *H01M 2/34* | (2006.01) |
| *H01M 10/42* | (2006.01) |
| *H01M 10/63* | (2014.01) |
| *H01M 10/653* | (2014.01) |
| *H01M 10/6551* | (2014.01) |
| *H01M 10/613* | (2014.01) |
| *H01M 10/6562* | (2014.01) |
| *H01M 10/0525* | (2010.01) |

(52) U.S. Cl.
CPC .............. *H01M 2/1077* (2013.01); *H01M 2/34* (2013.01); *H01M 10/425* (2013.01); *H01M 10/613* (2015.04); *H01M 10/63* (2015.04); *H01M 10/653* (2015.04); *H01M 10/6551* (2015.04); *H01M 10/6562* (2015.04); *H01M 10/0525* (2013.01); *Y02T 10/7011* (2013.01)

(58) Field of Classification Search
CPC .................................................. H01M 10/613
USPC ..................... 429/120, 62, 112, 71
See application file for complete search history.

(56) References Cited

U.S. PATENT DOCUMENTS

| 6,376,126 B1 * | 4/2002 | Faust .................... H01M 2/024 429/176 |
|---|---|---|
| 6,579,642 B2 * | 6/2003 | Yamane .............. B60L 11/1874 429/120 |
| 6,942,944 B2 * | 9/2005 | Al-Hallaj ........... H01M 2/1094 429/120 |
| 7,112,387 B2 * | 9/2006 | Kimoto et al. .................. 429/99 |
| 7,560,190 B2 * | 7/2009 | Ahn et al. ...................... 429/120 |
| 2004/0137313 A1 * | 7/2004 | Jaura et al. ....................... 429/62 |
| 2006/0091856 A1 * | 5/2006 | Lee ..................... H01M 2/1077 320/116 |
| 2006/0115714 A1 * | 6/2006 | Lee ....................... H01M 10/63 429/62 |
| 2006/0216582 A1 * | 9/2006 | Lee .................... H01M 2/1077 429/120 |
| 2008/0280192 A1 * | 11/2008 | Drozdz et al. .................. 429/62 |
| 2008/0318121 A1 * | 12/2008 | Takagi .......................... 429/120 |
| 2009/0004553 A1 * | 1/2009 | Nakamura ...................... 429/54 |
| 2009/0084023 A1 * | 4/2009 | Seniff ............................ 43/131 |
| 2009/0111015 A1 * | 4/2009 | Wood .................. H01M 2/1077 429/164 |
| 2009/0186266 A1 * | 7/2009 | Nishino et al. ............... 429/120 |
| 2009/0191451 A1 * | 7/2009 | Sato .................... H01M 2/1072 429/120 |
| 2010/0141214 A1 * | 6/2010 | Yoon et al. .................... 320/134 |

FOREIGN PATENT DOCUMENTS

KR    10-2005-0007648 A    1/2005

OTHER PUBLICATIONS

Office Action issued in corresponding Korean application, 10-2010-0007040, dated Apr. 25, 2011.

* cited by examiner

*Primary Examiner* — Ula C Ruddock
*Assistant Examiner* — Archer Dudley
(74) *Attorney, Agent, or Firm* — Lee & Morse, P.C.

(57) ABSTRACT

A battery pack for a vehicle, the battery pack including a sealed inner case accommodating a battery module; an open external case surrounding the inner case, the open external case including a first opening part having an open side and a second opening part having another open side; and an air flow channel between an external surface of the inner case and an inner surface of the external case, the air flow channel connecting the first opening part and the second opening part.

9 Claims, 5 Drawing Sheets

BATTERY PACK FOR A VEHICLE

BACKGROUND

1. Field

Embodiments relate to a battery pack for a vehicle.

2. Description of the Related Art

In general, a battery pack for vehicle may be used for an internal-combustion engine vehicle, an electric vehicle, and a hybrid electric vehicle. In particular, a battery pack used for an internal-combustion engine vehicle may drive electric apparatuses of a vehicle. A battery pack used for an electric vehicle may directly drive a vehicle instead of an internal-combustion engine. A battery pack used for a hybrid electric vehicle may drive a vehicle in a mutually assisting relationship with an internal-combustion engine.

The battery pack may include a battery module having a plurality of, e.g., lithium ion secondary batteries, connected in series.

Unlike a primary battery incapable of charging, the lithium ion secondary battery is capable of charging and discharging and is now extensively used in various fields, e.g., a mobile phone, a personal digital assistant (PDA), a notebook computer, and a vehicle. This use is due, in particular, to the lithium ion secondary battery having an operating voltage of about 3.6V (which is three times higher than a nickel-cadmium battery or a nickel-hydrogen battery, used for electronic equipment power) and a high energy concentration per unit weighty.

SUMMARY

Embodiments are directed to a battery pack for a vehicle, which represents advances over the related art.

It is a feature of an embodiment to provide a battery pack for a vehicle that facilitates cooling of the battery pack while the vehicle travels above a certain speed.

It is another feature of an embodiment to provide a battery pack for a vehicle that minimizes external heat that flows into the battery pack while the vehicle travels at low speed or stops At least one of the above and other features and advantages may be realized by providing a battery pack for a vehicle including a sealed inner case accommodating a battery module; an open external case surrounding the inner case, the open external case including a first opening part having an open side and a second opening part having another open side; and an air flow channel between an external surface of the inner case and an inner surface of the external case, the air flow channel connecting the first opening part and the second opening part.

The inner case may be formed of a metal material.

The battery pack may further include a radiator in the air flow channel.

The radiator may contact the inner case and may not contact the external case.

The radiator may include a heat sink plate on the external surface of the inner case; and a heat sink pin on the heat sink plate, the heat sink pin extending parallel to a flow direction of external air.

The external case may be supported by a spacer on the inner case.

The spacer may be formed of a vibration absorbing material.

The spacer may be formed of a rubber material having a low thermal conductivity and being capable of absorbing vibration.

The inner case may further include a battery management system electrically connected to the battery module, the battery management system being configured to manage the battery module, and being disposed forward of the battery module with respect to a flow direction of external air through the battery pack.

The inner may case further include a relay assembly electrically connected to the battery module, the relay assembly being configured to cut off a current flow, being disposed forward of the battery module with respect to a flow direction of external air through the battery pack, and being positioned parallel to the battery management system.

The first opening part may be disposed at a front of the external case with respect to a flow direction of external air through the battery pack.

The battery pack may further include a first foreign material blocking plate disposed at the first opening part of the external case, the first foreign material blocking plate including a plurality of holes for preventing foreign materials in external air from flowing into the first opening part.

The plurality of holes may include at least one main hole disposed around an edge portion of the first foreign material blocking plate adjacent to the air flow channel; and at least one sub hole disposed at a middle portion of the first foreign material blocking plate, wherein a diameter of the main hole is greater than a diameter of the sub hole.

The at least one main hole may include a plurality of main holes disposed around an entirety of the edge portion.

The second opening part may be disposed at a rear of the external case with respect to a flow direction of external air through the battery pack.

The battery pack may further include a second foreign material blocking plate disposed at the second opening part of the external case, the second foreign material blocking plate including at least one hole.

The at least one hole may be disposed at a middle portion of the second foreign material blocking plate.

The battery pack may further include a first foreign material blocking plate disposed at the first opening part of the external case, the first foreign material blocking plate including a plurality of holes for preventing foreign materials in external air from flowing into the first opening part, wherein the plurality of holes include at least one main hole disposed around an edge portion of the first foreign material blocking plate adjacent to the air flow channel; and at least one sub hole disposed at a middle portion of the first foreign material blocking plate, wherein a diameter of the main hole is greater than a diameter of the sub hole.

A diameter of the at least one hole in the second foreign material blocking plate may be greater than the diameter of the main hole in the first foreign material blocking plate.

The external case may be mounted on an exterior of the vehicle.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
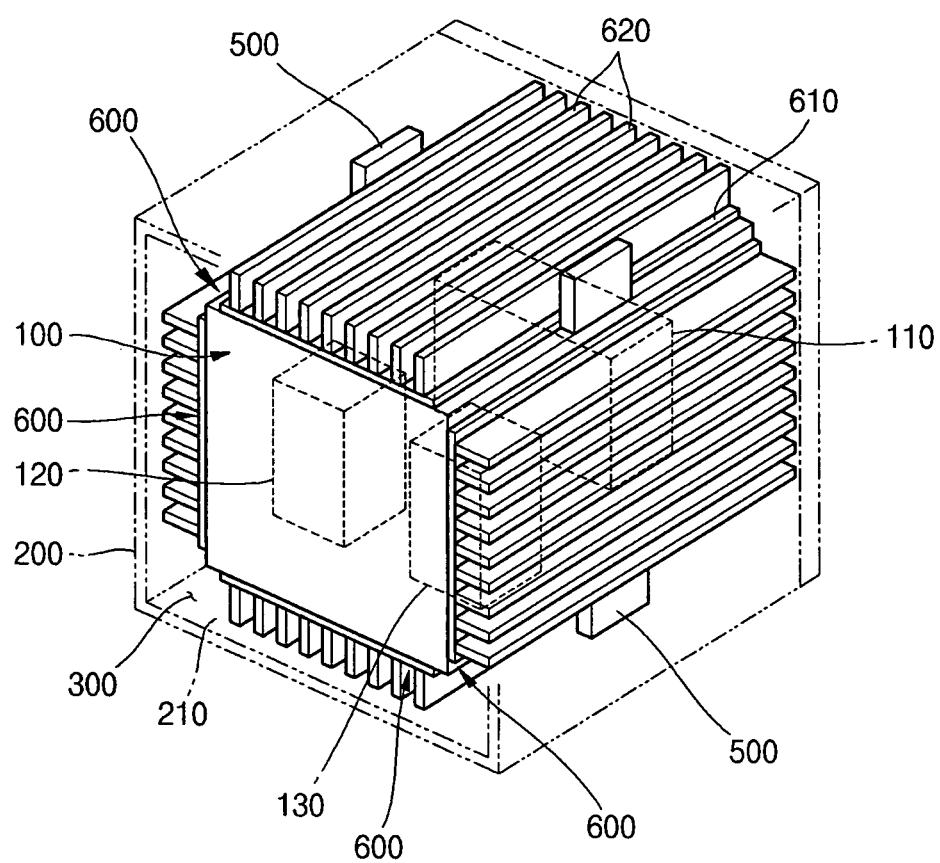
FIG. 1 illustrates a perspective view of a battery pack for a vehicle according to an embodiment, in which an external case is indicated with a dashed line to show the inside of the external case.

Korean Patent Application No. 10-2010-0007040, filed on Jan. 26, 2010, in the Korean Intellectual Property Office, and entitled: "Battery Pack for Vehicle," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
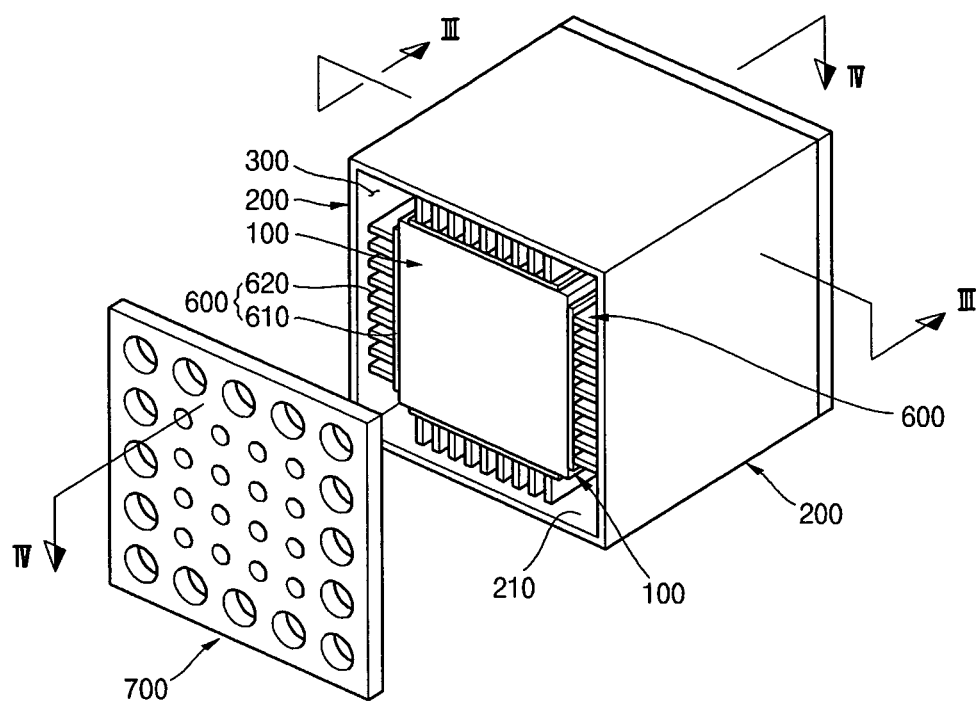
FIG. 2 illustrates a perspective view of the battery pack of FIG. 1 in which a first foreign material blocking plate is separated.
Figure 3:
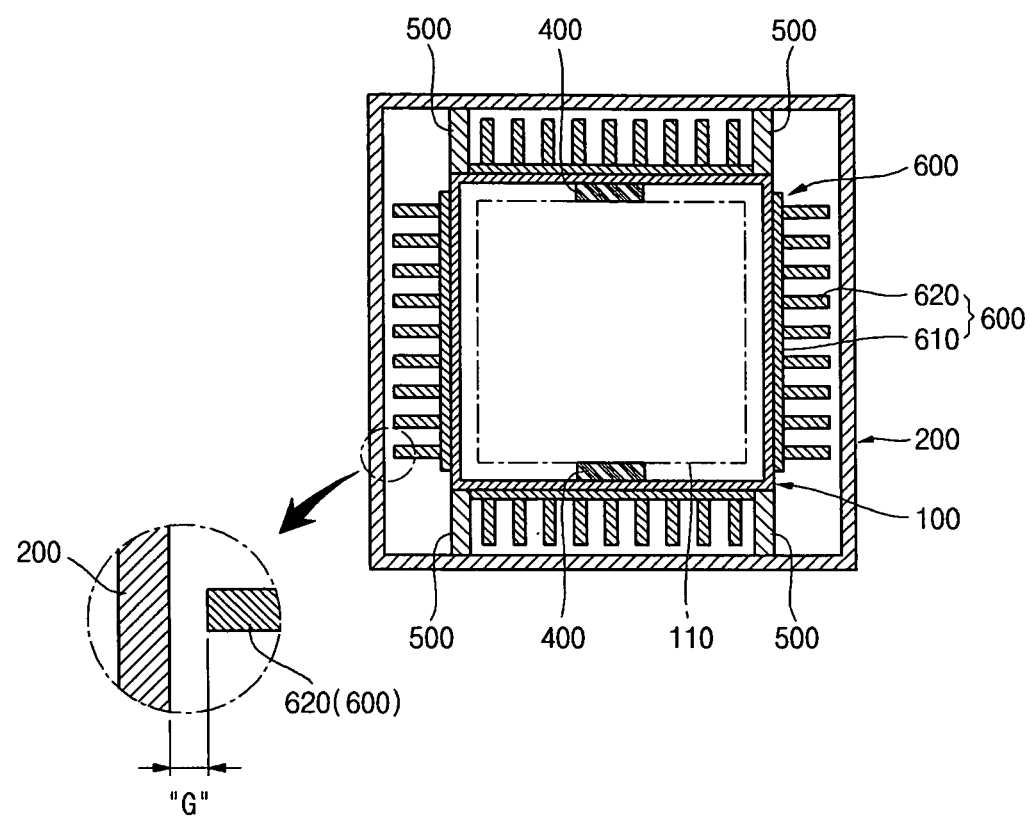
FIG. 3 illustrates a sectional view taken along the line III-III of FIG. 2.
Figure 4:
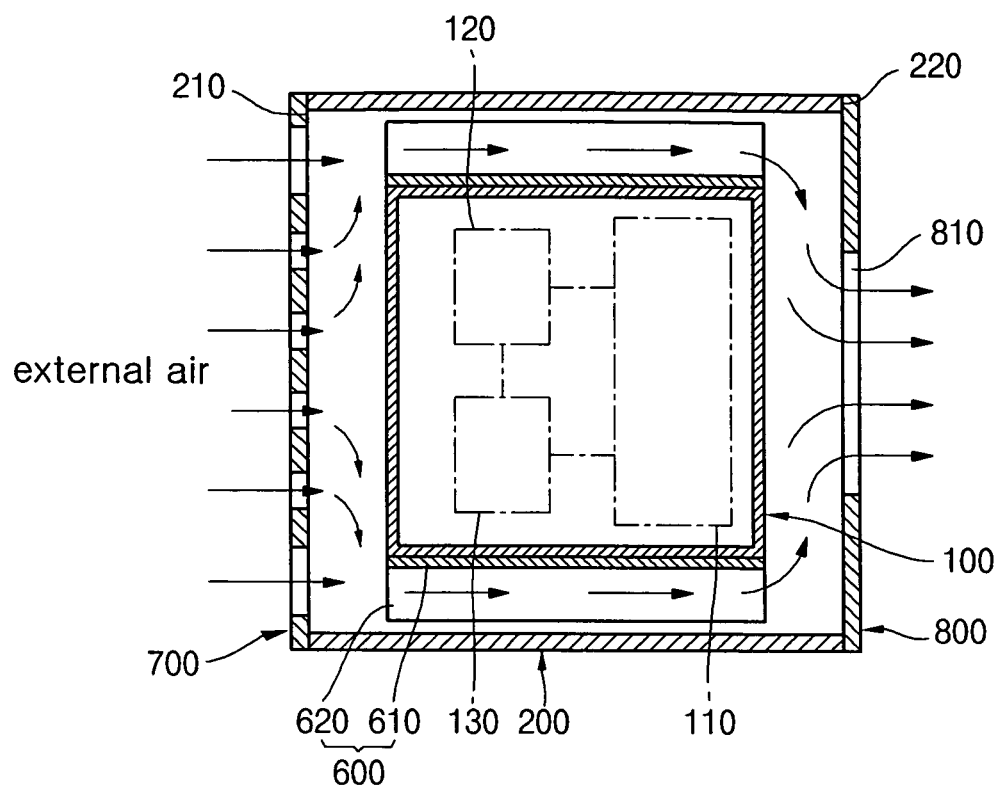
FIG. 4 illustrates a sectional view taken along the line IV-IV of FIG. 2.
Figure 5:
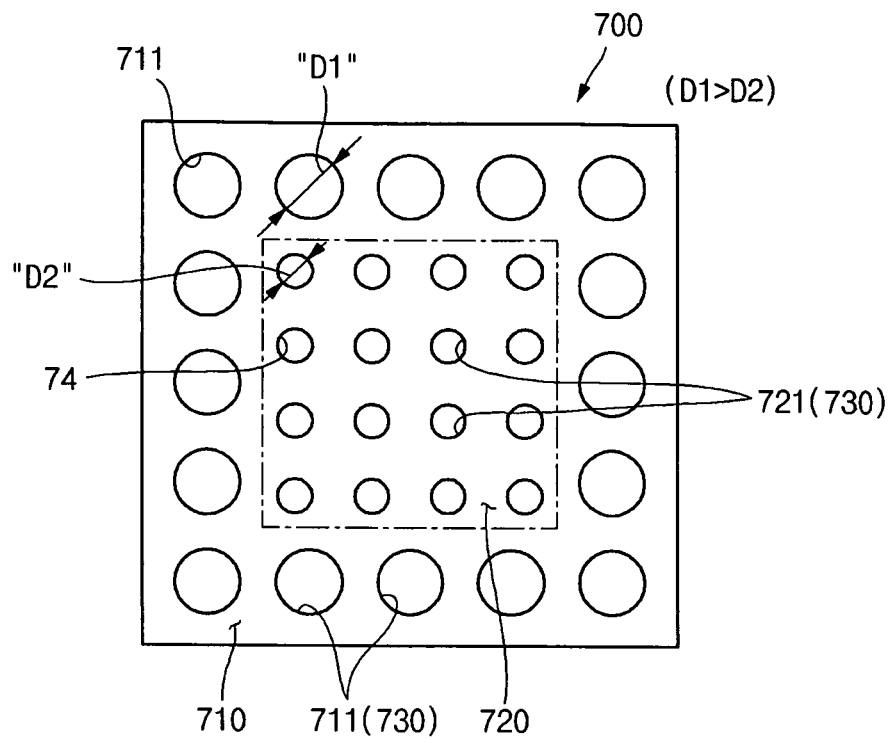
FIG. 5 illustrates a front view of a battery pack for vehicle according to an embodiment.
Figure 6:
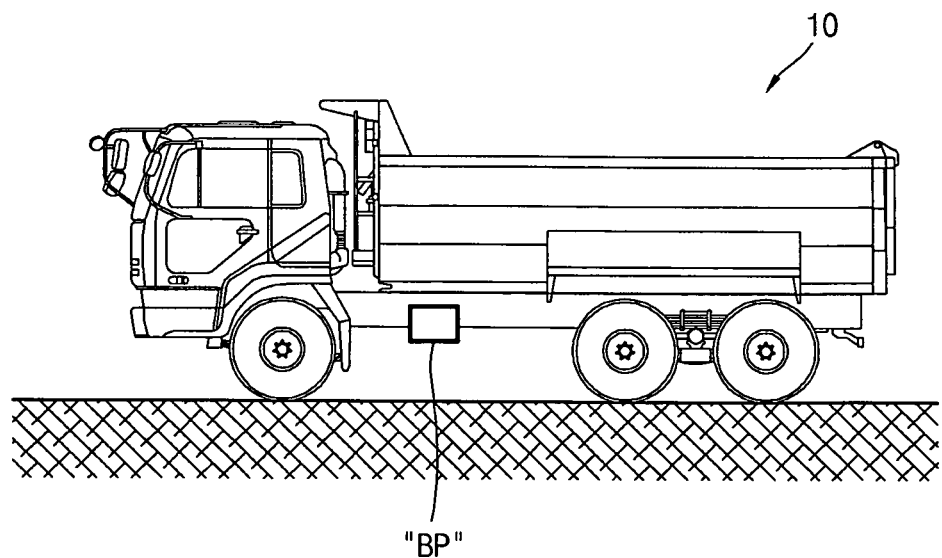
FIG. 6 illustrates a view when a battery pack for a vehicle according to an embodiment is mounted on an exterior of a vehicle.

FIG. 1 illustrates a perspective view of a battery pack for a vehicle according to an embodiment in which an external case is indicated with a dashed line to show the inside of the external case. FIG. 2 illustrates a perspective view of the battery of FIG. 1 in which a first foreign material blocking plate is separated. FIG. 3 illustrates a sectional view taken along the line III-III of FIG. 2. FIG. 4 illustrates a sectional view taken along the line IV-IV of FIG. 2. FIG. 5 illustrates a front view of a battery pack for vehicle according to an embodiment. FIG. 6 illustrates a view when a battery pack for vehicle according to an embodiment is mounted on an exterior of a vehicle.

The battery pack according to an embodiment may include an inner case 100, an external case 200, and an air flow channel 300 as illustrated in FIGS. 1 through 4.

The inner case 100 may be sealed to accommodate a battery module 110 and to prevent external air and moisture from directly contacting the battery module 110. In particular, since the inner case 100 is sealed, it may be formed of a metal (i.e., a material of a high thermal conductivity) for heat transfer with the battery module 110 in the inner case 100.

In addition, in order to support the battery module 110 by the inner case 100, as illustrated in FIG. 3, a first spacer 400 may be mounted between the inner case 100 and the battery module 110. In an implementation, the first spacer 400 may be formed of a vibration absorbing material, e.g., rubber, to absorb vibration from an external impact (for example, an impact from operation of a vehicle 10 of FIG. 6).

The battery module 110 may include a plurality of lithium ion secondary batteries connected in series. The lithium ion secondary battery may use a lithium based oxide as a positive electrode active material and a carbon material as a negative electrode active material. In addition, the lithium ion secondary battery may be formed with various shapes, e.g., a cylinder shape, a prismatic shape, a pouch shape, and so forth.

The external case 200 may surround the inner case 100. At least two sides of the external case 200 may be open. In particular, the external case 200, as illustrated in FIGS. 2 and 4, may include a first opening part 210 at a front end with respect to a flow direction of external air and a second opening part 220 at a rear end with respect to the flow direction of the external air. The first opening part 210 and the second opening part 220 may be part of a flow path of external air in addition to the air flow channel 300 that will be described below.

In addition, in order for the external case 200 to support the inner case 100, a second spacer 500 may be mounted between the external case 200 and the inner case 100. The second spacer 500 may be formed of a vibration absorbing material to absorb vibration from an external impact (for example, an impact from operation of the vehicle 10 of FIG. 6). In an implementation, the second spacer 500 may be formed of, e.g., a rubber material, that absorbs a vibration and has a low thermal conductivity. If the second spacer 500 has a low thermal conductivity, external heat transfer into the inner case 100 through the external case 200 and the second spacer 500 may be minimized.

The air flow channel 300 may be between an external surface of the inner case 100 and an inner surface of the external case 200 to connect the first opening part 210 and the second opening part 220. In particular, when the vehicle 10 of FIG. 6 travels at a speed of more than, e.g., about 20 km/h, external air may flow into the air flow channel 300. When the vehicle 10 of FIG. 6 travels at a speed of less than, e.g., about 20 km/h with repeated stops, a width (i.e., an interval between the external surface of the inner case 100 and the inner surface of the external case 200) of the air flow channel 300 may be selected to prevent external air from flowing into the air flow channel 300. For example, the width of the air flow channel 300 may be less than about 0.5 inch, but this numerical value may vary according to an installation position (i.e., an external air resistance, caused by peripheral components, may vary according to an installation position) and a size of a battery pack. Additionally, if a radiator 600 is further included in the air flow channel 300, the width of the air flow channel 300 may be further increased.

Therefore, according to an embodiment, when the vehicle 10 of FIG. 6 travels at a speed of more than, e.g., about 20 km/h, a flow velocity may occur, i.e., air may flow, through the air flow channel 300 such that the inner case 100 and the battery module 110 accommodated therein may be effectively cooled. In addition, when the vehicle 10 of FIG. 6 travels at a low speed of, e.g., about 20 km/h or stops, air flow may stop almost completely, and heat from the vehicle 10 of FIG. 6, or other external heat, which may otherwise be transferred to the inner case 100, may be blocked by the external case 200 and the air flow channel 300. In more detail, a portion of the heat may be blocked primarily by the external case 200; and remaining heat may be secondarily prevented by the air flow channel 300 (at this point, air in the air flow channel 300 may serve as an air layer for insulation). Therefore, transfer of the heat of the vehicle and external heat to the battery module 110 may be significantly prevented.

In particular, according to an embodiment, even if a vehicle is left for a long time during, e.g., the hot summer season, deterioration and life shortening of the battery module 110 caused by the heat may be minimized. Furthermore, as illustrated in FIG. 6, if the vehicle 10 having a battery pack BP installed thereon, e.g., a truck, and completely exposed to the environment, it may be greatly influenced by external heat. Therefore, if the battery pack BP for a vehicle according to an embodiment is applied to the vehicle 10, the above insulation effect may be significantly increased.

Additionally, as illustrated in FIGS. 1 through 4, a battery pack according to an embodiment may further include a radiator 600 equipped in the air flow channel 300.

The radiator 600 may contact the inner case 100 and may not contact the external case 200. That is, as illustrated in FIG. 3, the radiator 600 may be spaced a predetermined interval G from the external case 200. In particular, the radiator 600 may not contact the external case 200 in order to prevent external heat from transferring into the inner case 100 through the external case 200 and the radiator 600 when the vehicle 10 of FIG. 6 travels at a low speed or stops. That is, while the vehicle 10 of FIG. 6 travels at a low speed or stops, deterioration of the battery module 110 of the battery pack may be minimized.

In an implementation, the radiator 600 may include a heat sink plate 610 at the external surface of the inner case 100 and a heat sink pin or fin 620 disposed on the heat sink plate 610 and parallel to a flow direction of external air. In particular, since the heat sink pin 620 may be parallel to the flow direction of the external air, when the vehicle 10 of FIG. 6 travels normally, inflow resistance of the external air through the air flow channel 300 may be minimized.

Therefore, according to an embodiment including the radiator 600, when the vehicle 10 of FIG. 6 travels, the inner case 100 and the battery module 110 accommodated therein may be more easily cooled. Further, since the radiator 600 may impede an inflow of external air, when the vehicle 10 of FIG. 6 travels at a low speed, air flow through the air flow channel 300 may almost disappear. Therefore, transfer of the heat of the vehicle 10 of FIG. 6 and external heat to the battery module 110 may be further prevented.

Additionally, as illustrated in FIG. 4, the inner case 100 may further include a battery management system (BMS) 120 that is electrically connected to the battery module 110 and manages the battery module 110. The BMS 120 may be electrically connected to the battery module 110 and may be a management system that informs a user of, e.g., a remaining battery capacity and a life span, by measuring, e.g., a current, a voltage, and a temperature of a battery during charging/discharging, and may detect and prevent fire or explosion. The BMS 120 may include a battery management circuit module with a semiconductor device and a battery management circuit substrate for mounting the battery management circuit module. In particular, when the BMS 120 is included in the inner case 100, in order to minimize an influence of heat generated from the battery module 110 on the semiconductor device of the BMS 120, the BMS 120 may be disposed at a more forward position than the battery module 110 with respect to a flow direction of external air through the battery pack.

Additionally, as illustrated in FIG. 4, the inner case 100 may further include a relay assembly 130 that is electrically connected to the battery module 110 and cuts off a current flow if desired. The relay assembly 130 may be electrically connected between the battery module 110 and the BMS 120 and may cut off a current flow, if desired, together with the BMS 120. The relay assembly 130 may include a plurality of relays and a relay circuit substrate for mounting the plurality of relays. In particular, when the relay assembly 130 is included in the inner case 100, in order to minimize an influence of heat generated from the battery module 110 on the relay assembly 130, the relay assembly 130 may be disposed at a more forward position than the battery module 110 with respect to a flow direction of an external air and also may be disposed parallel to the BMS 120.

In addition, as illustrated in FIGS. 2, 4, and 5, the battery pack for a vehicle according to an embodiment may include a first foreign material blocking plate 700 equipped at the first opening part 210 of the external case 200. The first foreign material blocking plate 700 may include a plurality of holes 730 such that foreign materials in external air do not enter through the first opening part 210.

As illustrated in FIG. 5, the plurality of holes 730 may include at least one main hole 711 disposed adjacent to the air flow channel 300 around an edge portion 710 of the first foreign material blocking plate 700. In addition, the plurality of holes 730 may include at least one sub hole 721 disposed at a middle portion 720 of the first foreign material blocking plate 700. In an implementation, a diameter D1 of the main hole 711 may be larger than a diameter D2 of the sub hole 721 in order to allow more external air to flow into the main hole 711 at the air flow channel 300. As illustrated in FIG. 5, a plurality of main holes 711 may be positioned around an entirety of the edge portion 710 of the first foreign material blocking plate 700. Additionally, a plurality of sub holes 721 may be provided, e.g., in a matrix formation, in the middle portion 720 of the first foreign material blocking plate.

In addition, as illustrated in FIGS. 2, 4, and 5, the battery pack for a vehicle according to an embodiment may include a second foreign material blocking plate 800 disposed at the second opening part 220 of the external case 200 and having at least one hole 810. In particular, at least one hole 810 may be disposed at a middle portion of the second foreign material blocking plate 800 to allow air from the air flow channel 300 to discharge from the rear of the battery pack. The diameter of the at least one hole 810 may be larger than that of the main hole 711 in the first foreign material blocking plate 700. Accordingly, heat at the rear of the inner case 100 can be dissipated properly.

As mentioned above, the battery pack for a vehicle according to an embodiment may have the following effects.

According to an embodiment, when the vehicle 10 of FIG. 6 travels at a speed of more than, e.g., about 20 km/h, air may flow through the air flow channel 300 such that the inner case 100 and the battery module 110 accommodated therein may be effectively cooled. When the vehicle 10 of FIG. 6 travels at a low speed of, e.g., about 20 km/h or less with repeated stops, air flow may stop almost completely; and the heat of the vehicle 10 of FIG. 6 or external heat, which would otherwise be transferred to the inner case 100, may be blocked by the external case 200 and the air flow channel 300. In particular, a portion of the heat may be blocked primarily by the external case 200; and remaining heat may be secondarily blocked by air in the air flow channel 300. Therefore, transfer of the heat of the vehicle and external heat to the battery module 110 may be significantly reduced. In particular, according to an embodiment, even though the vehicle 10 of FIG. 6 may be left for a long time during, e.g., the hot summer season, deterioration and life shortening of the battery module 110 caused by external heat may be minimized.

In addition, according to an embodiment including the radiator 600, when the vehicle 10 of FIG. 6 travels, the inner case 100 and the battery module 110 accommodated therein may be more easily cooled. Further, since the radiator 600 may impede an inflow of external air when the vehicle 10 of FIG. 6 travels at a low speed with repeated stops, air flow in the air flow channel 300 may almost entirely stop. Therefore, transfer of the heat of the vehicle 10 of FIG. 6 and external heat to the battery module 110 may be further prevented. In addition, the battery pack for a vehicle according to an embodiment may be managed effectively, thereby preventing deterioration.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack for a vehicle, comprising:
   a sealed inner case accommodating a battery module and spaced apart from the battery module;
   an open external case surrounding the inner case and spaced apart from the inner case, the open external case including a first opening part having an open side and a second opening part having another open side, the open sides being open to external air;
   a first foreign material blocking plate disposed at the first opening part of the external case, the first foreign material blocking plate including a plurality of holes for preventing foreign materials in the external air from flowing into the first opening part;
   a second foreign material blocking plate disposed at the second opening part of the external case, the second foreign material blocking plate overlapping at least a portion of the second opening part and including at least one hole;
   an air flow channel between an external surface of the inner case and an inner surface of the external case, the air flow channel connecting the first opening part and the second opening part such that the external air can flow between the first opening part and the second opening part; and
   a radiator in the air flow channel, wherein:
   the sealed inner case is sealed to prevent the external air from directly contacting the battery module,
   the first opening part and the second opening part are facing each other,
   the second opening part is disposed at a rear of the external case with respect to a flow direction of the external air through the battery pack,
   the plurality of holes include main holes disposed adjacent to all edge portions of the first foreign material blocking plate adjacent to the air flow channel, and at least one sub hole disposed at a middle portion of the first foreign material blocking plate, wherein a diameter of each main hole is greater than a diameter of the at least one sub hole,
   the at least one hole is disposed at a middle portion of the second foreign material blocking plate adjacent to a center portion of a rear of the sealed inner case,
   the radiator contacts the inner case and does not contact the external case, the radiator including a plurality of heat sink pins,
   the main holes of the first foreign material blocking plate overlap the heat sink pins, and the at least one hole of the second foreign material blocking plate overlaps the rear of the sealed inner case, and
   the external case is supported by a spacer on the inner case, the spacer being formed of a vibration absorbing material.

2. The battery pack as claimed in a claim 1, wherein the inner case is formed of a metal material.

3. The battery pack as claimed in claim 1, wherein the radiator includes
   a heat sink plate on the external surface of the inner case; and
   the heat sink pins are on the heat sink plate, the heat sink pins extending parallel to the flow direction of the external air.

4. The battery pack as claimed in claim 1, wherein the spacer is formed of a rubber material having a low thermal conductivity and being capable of absorbing vibration.

5. The battery pack as claimed in claim 1, wherein the inner case further includes a battery management system electrically connected to the battery module, the battery management system:
   being configured to manage the battery module, and
   being disposed forward of the battery module with respect to the flow direction of the external air through the battery pack.

6. The battery pack as claimed in claim 5, wherein the inner case further includes a relay assembly electrically connected to the battery module, the relay assembly:
   being configured to cut off a current flow,
   being disposed forward of the battery module with respect to the flow direction of the external air through the battery pack, and
   being positioned parallel to the battery management system.

7. The battery pack as claimed in claim 1, wherein the first opening part is disposed at a front of the external case with respect to the flow direction of the external air through the battery pack.

8. The battery pack as claimed in claim 1, wherein a diameter of the at least one hole in the second foreign material blocking plate is greater than the diameter of each main hole in the first foreign material blocking plate.

9. The battery pack as claimed in claim 1, wherein the external case is mounted on an exterior of the vehicle.

* * * * *